O. A. PARKER.
WHEEL OR RIM CRATE.
APPLICATION FILED MAR. 3, 1917.
1,333,673.
Patented Mar. 16, 1920.
3 SHEETS—SHEET 1.
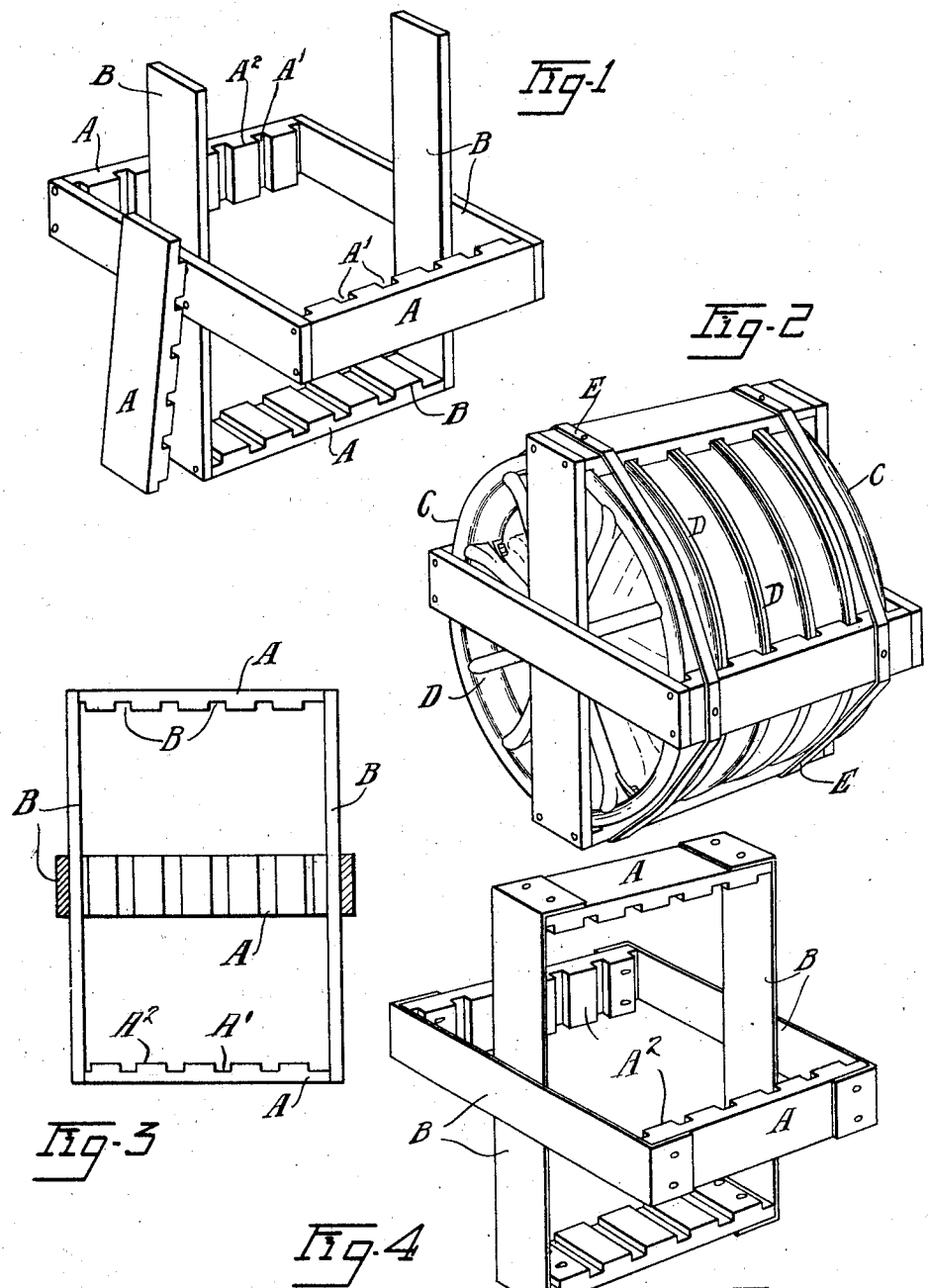

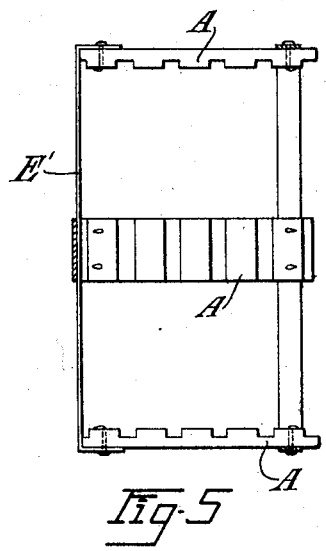
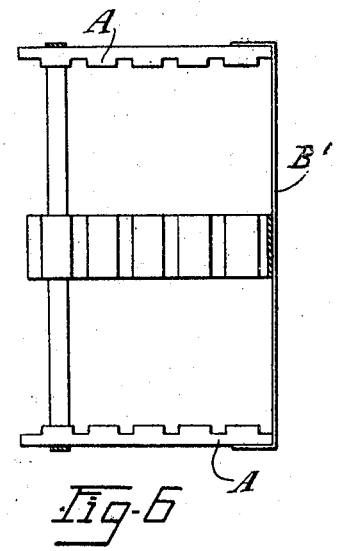
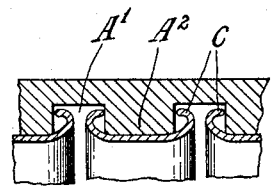
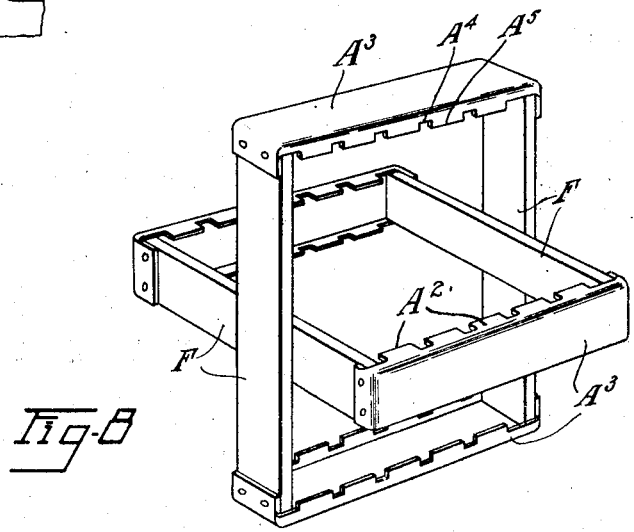

O. A. PARKER.
WHEEL OR RIM CRATE.
APPLICATION FILED MAR. 3, 1917.

1,333,673.

Patented Mar. 16, 1920.
3 SHEETS—SHEET 3.

UNITED STATES PATENT OFFICE.

ORREL A. PARKER, OF CLEVELAND, OHIO.

WHEEL OR RIM CRATE.

1,333,673.

Specification of Letters Patent. Patented Mar. 16, 1920.

Application filed March 3, 1917. Serial No. 152,283.

*To all whom it may concern:*

Be it known that I, ORREL A. PARKER, a citizen of the United States, residing at Cleveland, in the county of Cuyahoga and State of Ohio, have invented a certain new and useful Improvement in Wheel or Rim Crates, of which the following is a full, clear, and exact description, reference being had to the accompanying drawings.

This invention relates particularly to a crate for shipping tire carrying rims either in connection with the wheels or independent thereof, and the crate can be used for shipping other flanged bodies, and while primarily intended for shipping a series or set of articles it can be used for shipping a single article.

The object of the invention is to provide a crate in which the rims and rimmed wheels will be held securely in place and prevented from contacting with and injuring one another, and a still further object is to provide a crate which will only contact with the articles contained therein, at points where rubbing or abrasion is of no consequence.

Another object of the invention is to provide a crate in which the wheels can be quickly and easily inserted and from which they can be as quickly removed, and a still further object is to provide a wheel crate which can be knocked down and returned for repeated use.

With these objects in view and certain others which will become apparent as the description proceeds my invention consists in the novel features of construction and arrangement hereinafter fully described and pointed out in the claims.

Figure 9:
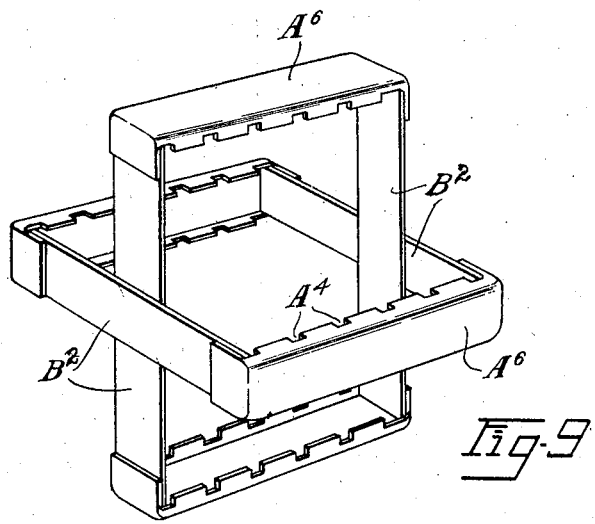
Figure 10:
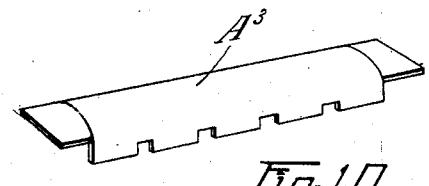
Figure 11:
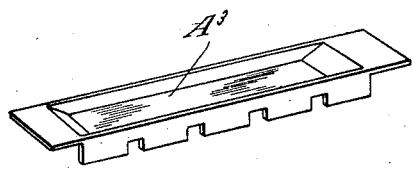
Figure 12:
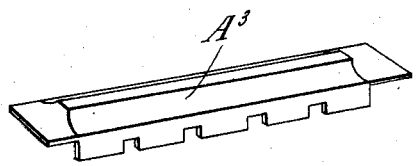

In the drawings forming a part of this specification Figure 1 is a perspective view of a crate ready to receive a series or set of rims or wheels having the tire carrying rims applied thereto; Fig. 2 is a detail perspective view of the crate with the rimmed wheels therein and all of the parts of the crate applied and fastened; Fig. 3 is a sectional view of the crate illustrated in Fig. 1; Fig. 4 is a detail perspective view of a crate embodying wooden body strips and metal end strips; Fig. 5 is a sectional view of the crate illustrated in Fig. 4, with metal strips at one end only; Fig. 6 is a sectional view showing a slight modification; Fig. 7 is a view illustrating the manner of holding the rims in place; Fig. 8 is a detail perspective view of a crate embodying metal body strips and wooden end strips; Fig. 9 is a perspective view of the crate embodying metal body and end strips and Figs. 10, 11 and 12 show modified forms of sheet metal strips.

In the drawings I have illustrated the crate as used in connection with wheels of the spider type in which the demountable tire carrying rim is applied directly to the ends of the spokes but it will be distinctly understood that this crate is equally as well adapted for use in connection with other types of automobile wheels in which the demountable tire carrying rim is applied to the felly band, and the crate can of course also be applied to wheels in which the tire carrying rim is permanently attached to the felly of the wheel. This crate can be made entirely of wood or entirely of metal or part metal and part wood and the general features of construction are exactly the same in all cases.

In constructing a crate in accordance with my invention, I employ a plurality of strips A, the opposed faces of which are grooved or notched as shown at A', leaving a series of intervening portions $A^2$.

These strips may be of any desired length, but in practice it is preferred to make them long enough to make a crate capable of carrying a set of five rims or rimmed wheels, this being the number usually supplied for each automobile.

Four strips A are usually employed for each crate and these are connected to the end pieces B, which cross each other and are preferably connected to each other by bolting or nailing when made of wood; or welded or bolted in case they are of metal.

The length of the end pieces is dependent upon the size of the rims or rimmed wheels to be transported as they should be substantially the same as the diameter of the rim to be placed therein.

In building the crate, one of the body strips is left disconnected and when it is desired to pack the crate it is only necessary to place the series or set of rims or wheels within the same, the flanges C of the rims being received in the grooves or notches A', without contacting while the intervening portions $A^2$ will engage the bottoms or tire seats D of the rims and thus position the rims between the plurality of notched or grooved strips and hold them out of contact with one another.

After the set of rims or wheels has been introduced in the crate, the remaining grooved or notched strip is secured in place and then in order to strengthen the crate and utilize the rigidity of the articles contained therein I employ straps or bands E of metal which are connected to the exterior of the notched or grooved strips, being passed circumferentially around the wheel rim and contacting with the rim intermediate the strips A as most clearly shown in Fig. 2. In the drawing I have shown this strip or band E as ordinary strap iron but it will of course be understood that one or more strands of wire or other material can be employed if so desired.

When the wheels have reached their destination it is only necessary to loosen the ends of the circumferential straps and remove one of the body strips and the wheels can then be immediately removed from the crate and the crate can then be returned in a knocked down condition for use again, it being understood that the cross pieces B can be easily disconnected or made to turn one within the other in order to provide a knock-down crate.

In Fig. 4 I have shown a somewhat modified form of construction in which the end pieces B' are of sheet metal, the ends being overlapped and connected to the end portion of the wooden body strips as most clearly shown. In a construction of this kind the circumferential straps will be used in exactly the same manner as previously pointed out. In Fig. 8 I have shown a modification in which the notched body strips $A^3$ are of sheet metal and the end pieces F of wood, the body strips being flanged and notched as shown at $A^4$, providing projections $A^5$ in order to engage and hold the wheels and rims properly positioned.

In Fig. 5 there are metal end pieces at one end and one circumferential band, connected to wooden notched strips and Fig. 6 shows the same construction with metal notched strips.

In Fig. 9 I have shown a still further modification in which the body strips and end pieces are both of sheet metal, the body strips $A^6$ being flanged and notched as shown and if desired the end pieces $B^2$ can be made either integral with the body strips or connected thereto by riveting or spot welding as preferred. In the construction shown in Figs. 8 and 9 circumferential bands E may be employed and connected to the metal strips by spot welding or otherwise, or strands of wire could be employed being wound around the body members and contacting with the wheel rims. When the crate is composed entirely of sheet metal the end pieces can be pivotally connected if desired so that the two sections of the crate can be compactly folded and returned as a knock-down crate. If made entirely of sheet metal the entire crate can be made of two pieces, each piece being shaped into a rectangular frame, and the ends united.

Figs. 10, 11, and 12 show the notched metal pieces $A^3$ and illustrate some of the many different forms these strips can be made in.

By means of a crate constructed as shown and described I am able to transport rims and wheels without the slightest danger of damage, as the rims and wheels are held spaced from one another, and the projecting portions $A^2$ and $A^5$ contact with the bottoms of the tire seats of the rims, and any rubbing or abrasion at this point is of no consequence, and while the flange of the rims enter the grooves or notches they do not contact with the end strip nor with each other. Furthermore in making up this crate I utilize the rigidity of the articles carried, and bind the positioning strips securely thereto, by either or both the end pieces and the circumferential bands.

In case wire wheels are to be transported, or wheels with hubs and brake drums, the notches can be spaced so as to keep the wheel and hub parts out of contact with each other or the ends of the crate.

It is obvious that the end pieces can be dispensed with when circumferential bands are used unless these end pieces are desired to protect the outside wheels from injury, and it will also be understood that a circumferential band or bands will not be necessary when the crate has otherwise sufficient rigidity.

Having thus described my invention, what I claim is:

1. A crate for wheels having channeled peripheral portions, said crate comprising at least a pair of oppositely disposed strips having notches therein adapted to receive the flange portions of the wheel peripheries, the portions of the strips between the notches being adapted to engage the bases of the channeled peripheral portions of the wheels, and means for connecting the ends of said strips.

2. A wheel crate of the kind described comprising at least a pair of oppositely disposed strips, the opposed faces of said strips having a plurality of notches cut therein, said notches being of such size and so positioned with reference to each other as to receive therein the flange portions of wheel peripheries, the intervening portions being adapted to engage the faces of wheel peripheries, end pieces connecting the strips and a circumferential band passing around the notched strips and adapted to contact with the wheel peripheries.

3. A crate for transporting wheels having flanged peripheries, said crate comprising a plurality of strips, end pieces connecting each pair of strips, the opposed faces of said strips having notches produced therein, said notches being of such size and so positioned as to receive the flanged portions of the wheel peripheries, the intermediate portions of said strips being adapted to engage the bases of the channeled peripheries, the end pieces being connected together, and a band connected to the exterior of the strips and adapted to engage the wheel peripheries intermediate said strips.

In testimony whereof, I hereunto affix my signature.

ORREL A. PARKER.